(12) United States Patent
Tjellesen et al.

(10) Patent No.: US 12,485,614 B2
(45) Date of Patent: Dec. 2, 2025

(54) APPARATUS FOR THE MANUFACTURE OF THREE-DIMENSIONAL OBJECTS

(71) Applicant: Stratasys Powder Production Ltd., Cambridge (GB)

(72) Inventors: Frederik Tjellesen, Cambridge (GB); Anders Hartmann, Cambridge (GB)

(73) Assignee: Stratasys Powder Production Ltd., Nottingham (GB)

( * ) Notice: Subject to any disclaimer, the term of this patent is extended or adjusted under 35 U.S.C. 154(b) by 530 days.

(21) Appl. No.: 17/685,041

(22) Filed: Mar. 2, 2022

(65) Prior Publication Data

US 2022/0184887 A1 Jun. 16, 2022

Related U.S. Application Data

(62) Division of application No. 16/765,006, filed as application No. PCT/GB2018/053337 on Nov. 16, 2018.

(30) Foreign Application Priority Data

Nov. 17, 2017 (GB) ........................ 1719094

(51) Int. Cl.
| | | |
|---|---|---|
| *B29C 64/153* | (2017.01) | |
| *B01F 27/053* | (2022.01) | |
| *B01F 27/112* | (2022.01) | |
| *B01F 27/1121* | (2022.01) | |
| *B01F 27/1125* | (2022.01) | |

(Continued)

(52) U.S. Cl.
CPC .......... *B29C 64/314* (2017.08); *B01F 27/053* (2022.01); *B01F 27/112* (2022.01); *B01F 27/1121* (2022.01); *B01F 27/1125* (2022.01); *B22F 12/57* (2021.01); *B29C 64/153* (2017.08); *B29C 64/241* (2017.08); *B29C 64/245* (2017.08); *B29C 64/255* (2017.08); *B33Y 10/00* (2014.12); *B22F 10/28* (2021.01); *B22F 10/73* (2021.01); *B22F 12/13* (2021.01); *B22F 12/17* (2021.01); *B22F 12/90* (2021.01); *B29C 64/209* (2017.08); *B29C 64/295* (2017.08); *B29C 64/35* (2017.08); *B33Y 30/00* (2014.12)

(58) Field of Classification Search
CPC ................ B01F 27/091; B01F 27/1121; B01F 27/1125; B01F 27/112; B29C 64/314
See application file for complete search history.

(56) References Cited

U.S. PATENT DOCUMENTS

| | | | | |
|---|---|---|---|---|
| 1,084,210 A | * | 1/1914 | Howard .................. | B01F 27/93 366/302 |
| 2,957,681 A | * | 10/1960 | Moultrie ............... | B01F 27/705 366/296 |

(Continued)

FOREIGN PATENT DOCUMENTS

GB 882275 A * 7/1960

*Primary Examiner* — Elizabeth Insler
(74) *Attorney, Agent, or Firm* — Honigman LLP; Eric J. Sosenko; Jonathan P. O'Brien

(57) ABSTRACT

A stirring device for a powder tank of an apparatus for manufacturing a three-dimensional object. The stirring device is configured to rotate within the powder tank about an axis of rotation, and comprises a base plate and a strut. The strut extends from the base plate and is arranged to extend into the powder tank forming an obtuse angle with the outer edge of the base plate.

5 Claims, 14 Drawing Sheets

(51) Int. Cl.
  *B22F 12/57*    (2021.01)
  *B29C 64/241*   (2017.01)
  *B29C 64/245*   (2017.01)
  *B29C 64/255*   (2017.01)
  *B29C 64/314*   (2017.01)
  *B33Y 10/00*    (2015.01)
  *B22F 10/28*        (2021.01)
  *B22F 10/73*        (2021.01)
  *B22F 12/13*        (2021.01)
  *B22F 12/17*        (2021.01)
  *B22F 12/90*        (2021.01)
  *B29C 64/209*       (2017.01)
  *B29C 64/295*       (2017.01)
  *B29C 64/35*        (2017.01)
  *B33Y 30/00*        (2015.01)

(56) References Cited

U.S. PATENT DOCUMENTS 3,616,266 A * 10/1971 Hall ................... C10B 1/10
                                              202/133
3,690,621 A *  9/1972 Tanaka ................ B01F 27/111
                                              261/84
5,607,648 A *  3/1997 Carter ................. F27D 25/001
                                              423/613

* cited by examiner

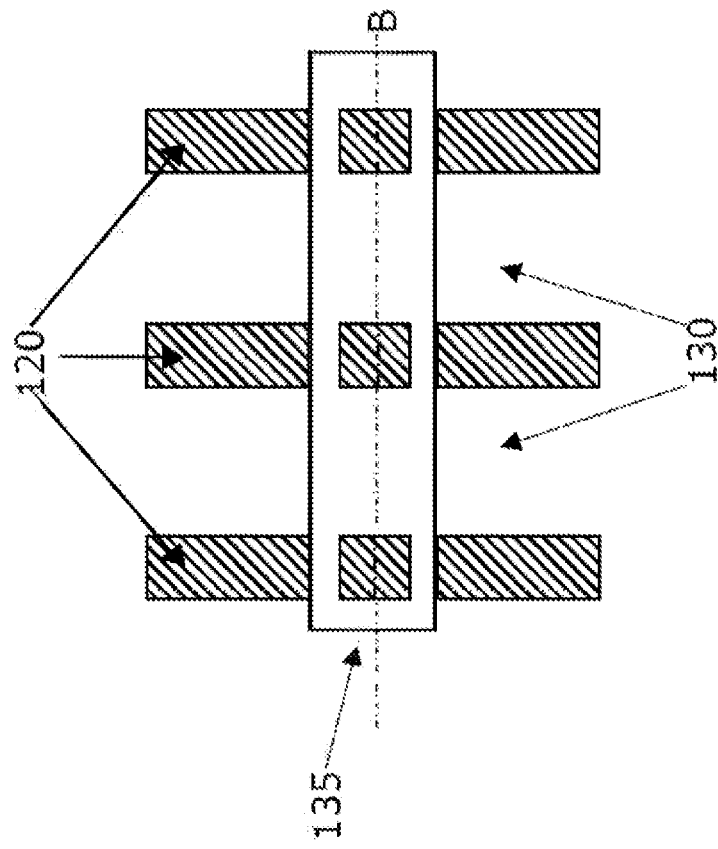
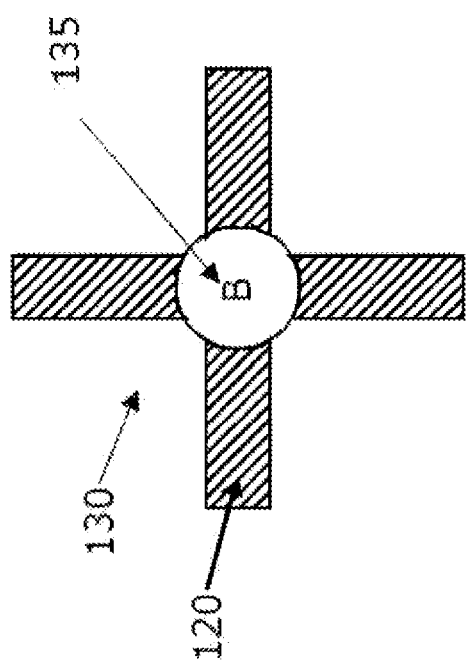
FIGURE 9A
FIGURE 9B

APPARATUS FOR THE MANUFACTURE OF THREE-DIMENSIONAL OBJECTS

CROSS REFERENCE TO RELATED APPLICATIONS

This application is a divisional patent application of U.S. application Ser. No. 16/765,006, filed May 18, 2020, which is a national stage entry of international application no. PCT/GB2018/053337, filed Nov. 16, 2018, which claims priority to United Kingdom application no. 171909.4, filed Nov. 17, 2017, the entire contents of each of which are herein incorporated by reference.

FIELD OF THE INVENTION

The present techniques relate to apparatus for the manufacture of three-dimensional objects. More particularly, the techniques relate to an agitator for use in the apparatus for the manufacture of three-dimensional objects.

BACKGROUND TO THE INVENTION

Apparatus for the manufacture of three-dimensional objects from a powder-based material using a process such as binder jet, laser sintering (LS) or high speed sintering (HSS) are known. These processes require the deposition of a layer of powder-based material. LS apparatus, which may use polymeric or metal powders, then uses a laser to trace the shape of a layer of the object in the powdered material, sintering the powdered material. Another layer of powdered material is then deposited and the shape of the next layer of the object is traced by the laser, and so on, to fabricate a three-dimensional object. A process using an electron beam may further be used to fuse metal powder.

In contrast to LS or electron beam where the energy source is required to trace the shape of the object in each layer of powdered material, a high speed sintering (HSS) or binder printing process may be used. In HSS, a radiation absorbing material (RAM) is printed in the shape of each layer of the object onto the layer of powder, typically in one pass of a printhead or row of printheads. Then each printed layer is irradiated with a radiation source, for example an infrared light, across the entire build area, such that only the powder to which the RAM has been applied is fused. In a binder jet process, a binder such as an adhesive is deposited in a defined pattern on the powder layer that may be based on polymer, ceramic or metal powder, using a printhead. The binder acts as an adhesive between the powder layers. Radiation may be used optionally to cure the binder.

All the above methods require a powder delivery and deposition system.

SUMMARY OF THE INVENTION

Aspects of the invention are set out in the appended independent claims, while details of particular embodiments are set out in the appended dependent claims.

BRIEF DESCRIPTION OF THE DRAWINGS

Embodiments will now be described with reference to the accompanying Figures.

FIGS. 9A and 9B schematically illustrate the agitator of FIG. 8.

DETAILED DESCRIPTION

The following disclosure describes an agitator for agitating powder within a powder flow path of an apparatus for manufacturing three-dimensional objects, the agitator configured to at least partially rotate about an axis of rotation, within the powder flow path, and wherein at least one projection extends outwardly from the agitator; the at least one projection being configured to contact the powder during the at least partial rotation of the agitator and impart a substantially zero net axial directional force on the powder during the at least partial rotation of the agitator, such that the at least partial rotation of the agitator maintains the powder within the powder flow path in a free flowing state.

The following disclosure additionally describes a stirring device for a powder tank of an apparatus for manufacturing a three-dimensional object, the stirring device configured to rotate within the powder tank about an axis of rotation, and comprising: at least one base plate; at least one strut extending from the at least one base plate into the powder tank, and forming an obtuse angle facing the direction of rotation.

The following disclosure additionally describes an apparatus for manufacturing a three-dimensional object comprises an agitator described herein.

The following disclosure additionally describes an apparatus for manufacturing a three-dimensional object comprises a stirring device described herein.

Reference will now be made in detail to the embodiments, examples of which are illustrated in the accompanying drawings. In the following detailed description numerous specific details are set forth by way of examples in order to provide a thorough understanding of the relevant teachings. However, it will be apparent to one of ordinary skill in the art that the present teachings may be practiced without these specific details.

Figure 1:
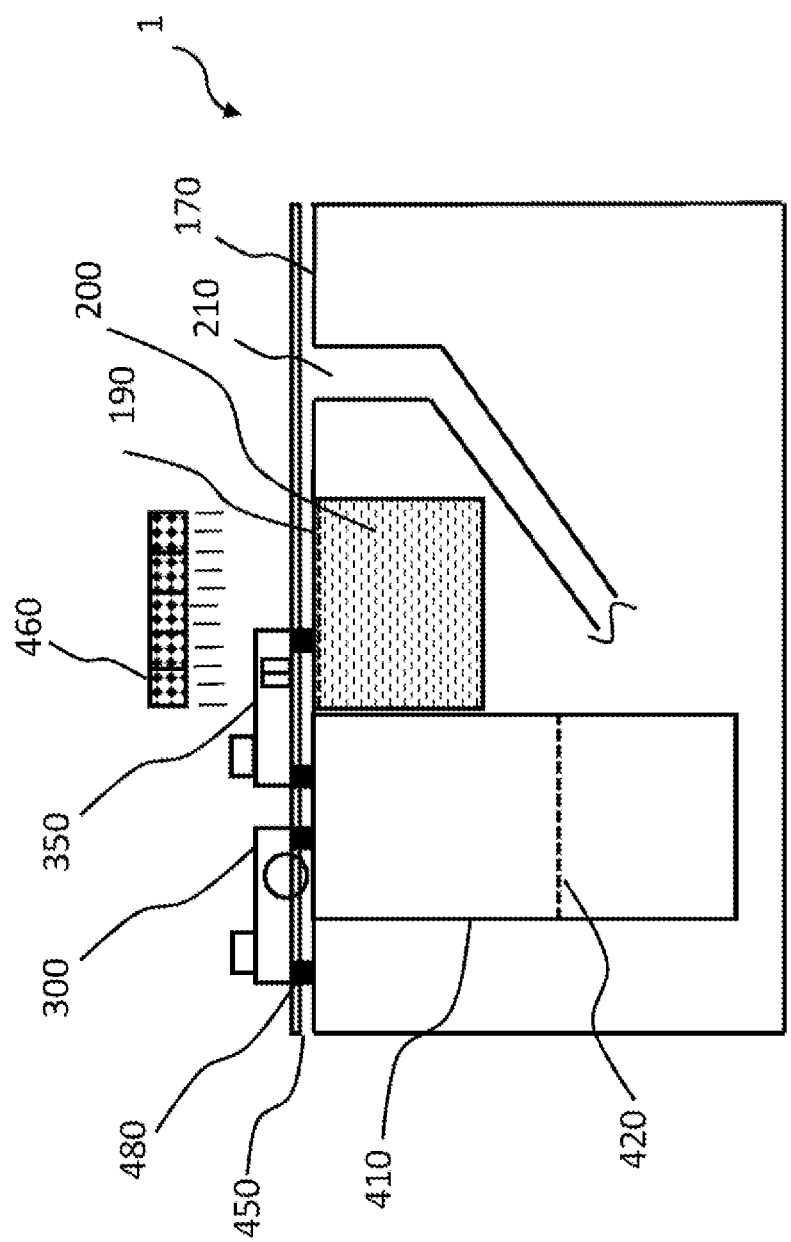
FIG. 1 schematically illustrates an apparatus for manufacture of three-dimensional objects.

FIG. 1 schematically illustrates an apparatus 1 for the manufacture of three-dimensional objects which uses high speed sintering (HSS) as a method to create three dimensional objects from a powder based material.

The apparatus 1 fabricates three-dimensional objects from a build powder. The build powder may be, or may comprise, a thermoplastic polymeric material such as PA12, PA6, polyurethane or other polymers. Some metals or ceramics may also be compatible with similar apparatus dependent on the process used.

The apparatus 1 comprises a holding tank 410 for storing the build powder. The build powder is deposited in the holding tank 410 as required. According to one embodiment, fresh "virgin" powder is deposited in the holding tank 410. Fresh powder is considered to be powder which has not been used in the apparatus 1 previously. As discussed in more detail later, according to another embodiment, excess powder which is not sintered during a cycle of the apparatus 1 may be returned to the holding tank 410 and blended with the virgin powder.

The apparatus 1 also comprises a powder distribution sled 300 and a printing sled 350 arranged on bearings 480 on rails 450. The rails 450 suspend the sleds 300, 350 above a work surface 170 of the apparatus 1. The work surface 170 comprises a build area 190 provided at the top of a build chamber 200. An overhead heater 460, such as a ceramic lamp, may be provided above the build area 190, and a return slot 210 may be provided to one side of the build area 190 as illustrated in FIG. 1.

The holding tank 410 is provided with a stirring device 420. The stirring device 420 agitates the powder and keeps the powder flowing freely, preventing the powder from becoming compacted in the holding tank 410. This results in a steady flow of powder to the feeding tube 428, discussed later. In addition, the stirring device 420 mixes the virgin powder with any excess powder which is returned to the holding tank 410, if present, to create a uniformly mixed build powder. According to one embodiment, the powder is continuously agitated following introduction to the holding tank 410 to keep the powder in a freely flowing state ready for use. In another embodiment the powder in the holding tank 410 may be periodically agitated.

Figure 2:
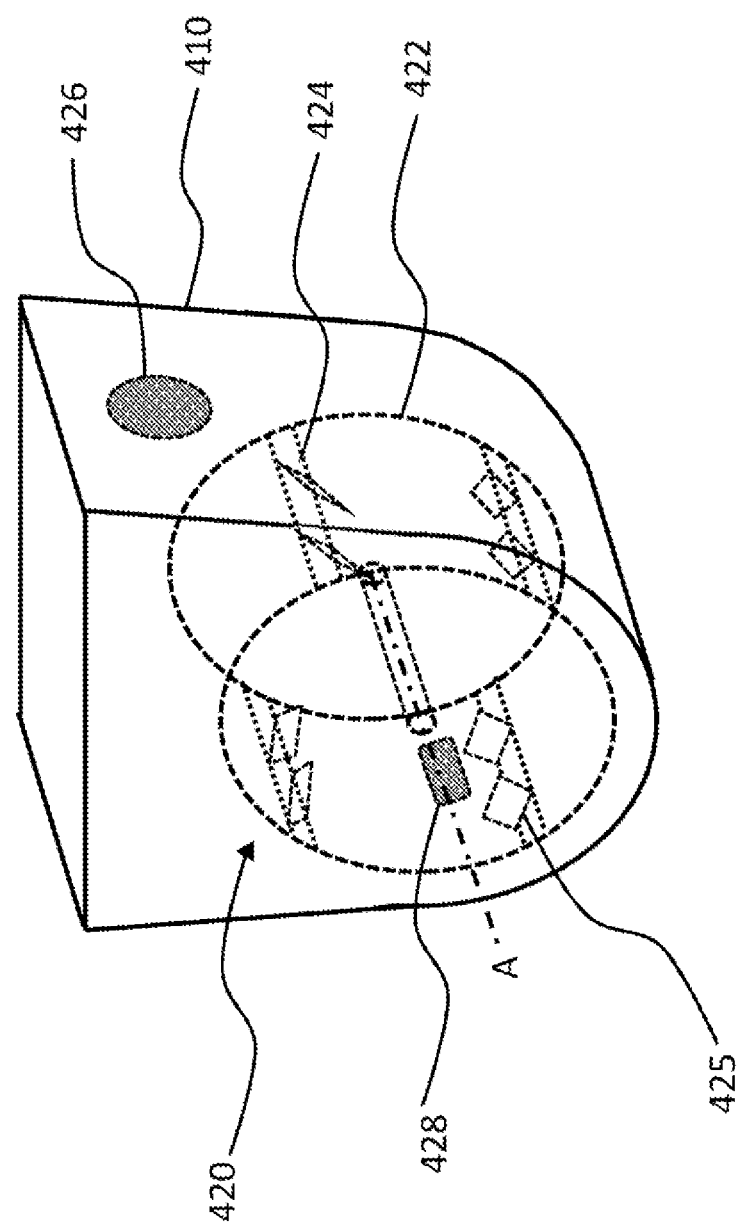
FIG. 2 schematically illustrates a holding tank of the apparatus.
Figure 3:
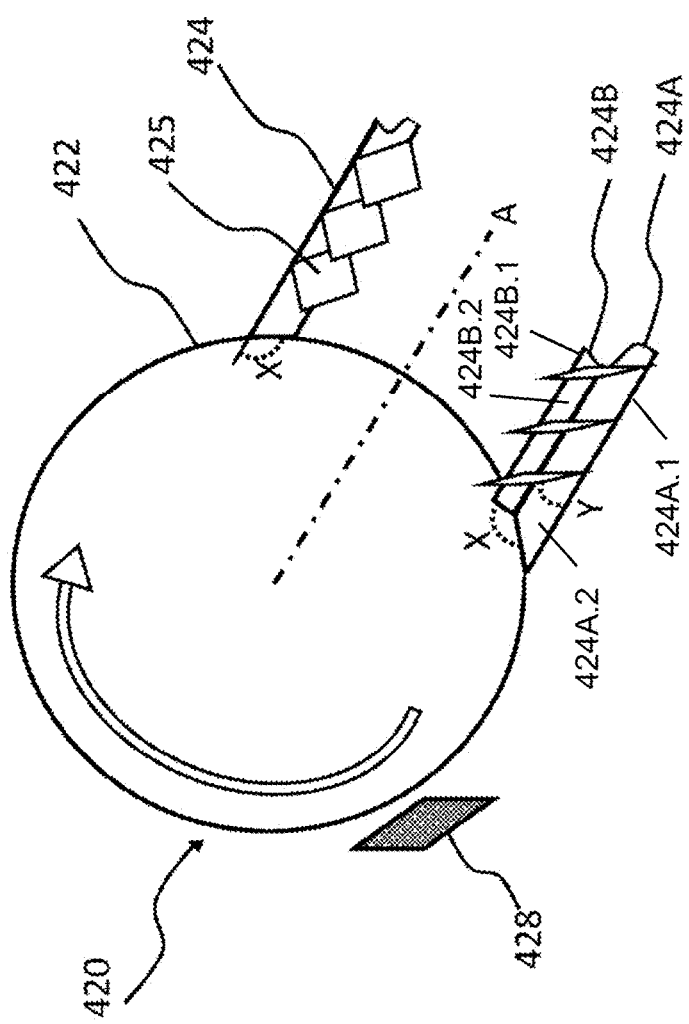
FIG. 3 schematically illustrates a stirring device of the apparatus.

FIGS. 2 and 3 schematically illustrate a cut through of a holding tank 410. The stirring device 420 rotates within the holding tank 410 about a central axis A. The stirring device 420 comprises two base plates 422. The base plates 422 may conform to the internal shape of the holding tank 410, or at least to the shape near or comprising the bottom (with respect to gravity) of the holding tank 410, with tolerances to allow the base plates 422 to freely move within the holding tank 410. The base plates 422 are not limited to being circular in shape, as illustrated in FIGS. 2 and 3, and may, for example be elliptical, or hexagonal in shape, but providing at least one dimension whose location provides that a strut may be mounted to sweep closely past the inner wall surface of the tank 410. Struts 424 extend between the base plates 422, connecting the base plates 422. According to one embodiment, the struts 424 are provided at or near to the external edge of the base plates 422. Blades 425 extend from the struts 424 and project into the holding tank 410. As the stirring device 420 rotates within the holding tank 410, the blades 425 agitate and mix the powder, keeping the powder in a free-flowing state of uniform density.

The struts 424 may be attached to the base plates 422 at regular or irregular intervals. In addition, any number of struts 424 may be provided. According to one embodiment, only one base plate 422 may be provided, the struts 424 extending from that base plate 422. In addition, any number of blades 425 may be provided, as required to maintain the powder in a free-flowing state. The blades 425 may be attached to the struts 424 at regular or irregular intervals.

The struts 424 have the function of lifting the powder within the holding tank 410 as the stirring device 420 is rotated about an axis of rotation A. In one embodiment, the struts 424 may be flat and form an obtuse angle with respect to the outer edge of base plate 422. In another embodiment, as illustrated in FIG. 3, this may be achieved by the struts 424 having a leading portion 424A parallel to the axis of rotation A with a leading edge 424A.1 with respect to the direction of rotation and a trailing portion 424B with a trailing edge 424B.1 with respect to the direction of rotation. The leading portion 424A further includes an inner face 424A.2 facing into the tank, and the trailing portion includes an inner face 424B.2 facing into the tank and which makes an obtuse angle X to the inner face 424A.2 of the leading portion 424A.

The stirring device rotates in the direction indicated by the arrow in FIG. 3. Rotation in the opposite direction will cause the powder to become compacted rather than lifted and kept in a free flowing state.

The blades 425 extend from the struts 424 towards the central axis of rotation A of the holding tank 410. The blades 425 are provided at an angle Y to the struts 424, such that the blades 425 form an acute angle with the struts 424, as illustrated in FIG. 3. The blades 425 cause the powder to be further agitated by causing the powder to be moved in an axial direction at the same time as being lifted by the struts 424. This additionally aids the stirrer 420 in keeping the powder in a free flowing state.

According to one embodiment, the holding tank 410 is not heated. This is because prolonged elevated temperatures tend to degrade the build powder. For example, PA6 oxidises at a faster rate when heated, reducing its shelf life. Consequently, when using a powder such as PA6, it is desirable that the holding tank 410 is not heated. However, according to another embodiment, the holding tank 410 may be heated if required.

Furthermore, some powders may benefit from active cooling to slow down degradation of the powdered material. This may take the form of circulation of cooled liquid or gas around the external surface of the holding tank 410 or the use of heat sinks attached to the external surface of the holding tank 410. According to another embodiment, cooled gas may be introduced into the holding tank 410 to cool the powder with the tank 410 to a predetermined temperature.

Figure 4:
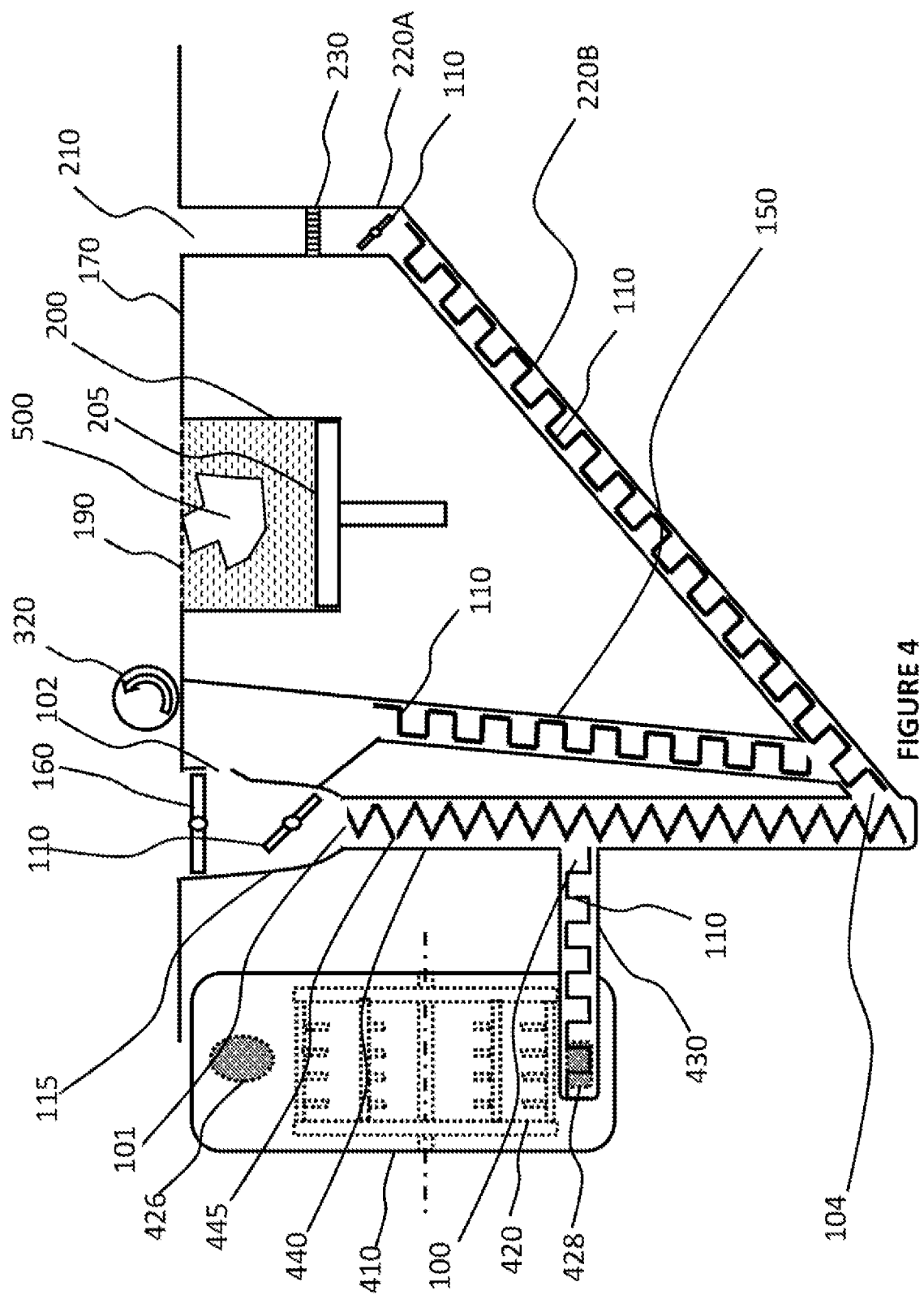
FIG. 4 schematically illustrates a cut through of components of the apparatus.

As can be seen from FIG. 2, powder enters the holding tank 410 through inlet 426 and exits the holding tank 410 through outlet 428. Upon exit from the holding tank 410, via the outlet 428, the powder travels into a supply tube 430 (shown in FIG. 4). The outlet 428 may, for example, be located at the bottom of the holding tank 410, or may be located on a wall of the holding tank 410. FIGS. 2 to 4 illustrate the outlet 428 being located on a wall of the holding tank 410, above the floor of the holding tank 410. For this location, the stirrer device 420 within the tank 410 ensures that powder below the outlet 428 is being used and prevents the compaction of the powder in the tank 410 and/or near the outlet 428.

The powder flows through the outlet 428 into the supply tube 430. The supply tube 430 may comprise an agitator arranged within the supply tube 430, which aids the free flow of the powder, by gravitational force alone, along the supply tube 430 to a delivery tube 440. Such an agitator may be arranged according any of the agitators described in more detail below. The powder then enters the delivery tube 440 at inlet 100.

The delivery tube 440 comprises a delivery mechanism arranged within the delivery tube 440, which aids movement of the powder along the delivery tube 440 to an inlet 101 to a powder repository 115. According to one embodiment, the delivery mechanism comprises an auger screw 445 provided within the delivery tube 440, extending at least within the majority of the delivery tubes 440 length. The auger screw diameter is slightly smaller than the inner diameter of the delivery tube 440, such that the auger screw 445 is capable of rotation within the delivery tube 440. As known in the art, an auger screw 445 comprises a helical blade, which, when rotated within the delivery tube 440, conveys the powder along the direction of the axis of rotation. The auger screw 445 may be arranged to convey the powder from the inlet 100 along the delivery tube 440 towards the inlet 101 to the powder repository 115 by imparting on the powder a force along the axis of rotation. According to one embodiment, the delivery tube 440 may be arranged at an angle to the vertical direction, such that the delivery tube is angled upwards with respect to the gravitational direction.

According to one embodiment, as illustrated in FIGS. 2 and 4, the supply tube 430 is connected to the delivery tube 440 at inlet 100, located part way along the length of the delivery tube 440 and the auger screw 445. For example, the supply tube 430 may be connected to the delivery tube 440 at about halfway along the length of the auger screw 445. The above described arrangement of the holding tank 410, supply tube 430 and delivery tube 440 enables the holding tank 410 to be contained below a work table level (work surface 170) of the apparatus 1, minimising the vertical height that the powder needs to be conveyed to reach the work surface 170, and providing space below the connection point 100 of the supply tube 430 to the delivery tube 440 where other paths may be connected to the delivery tube 440.

When the holding tank 410 is unheated, the supply tube 430 may be thermally decoupled from the delivery tube 440 via insulation between the supply tube 430 and the delivery tube 440.

Figure 5:
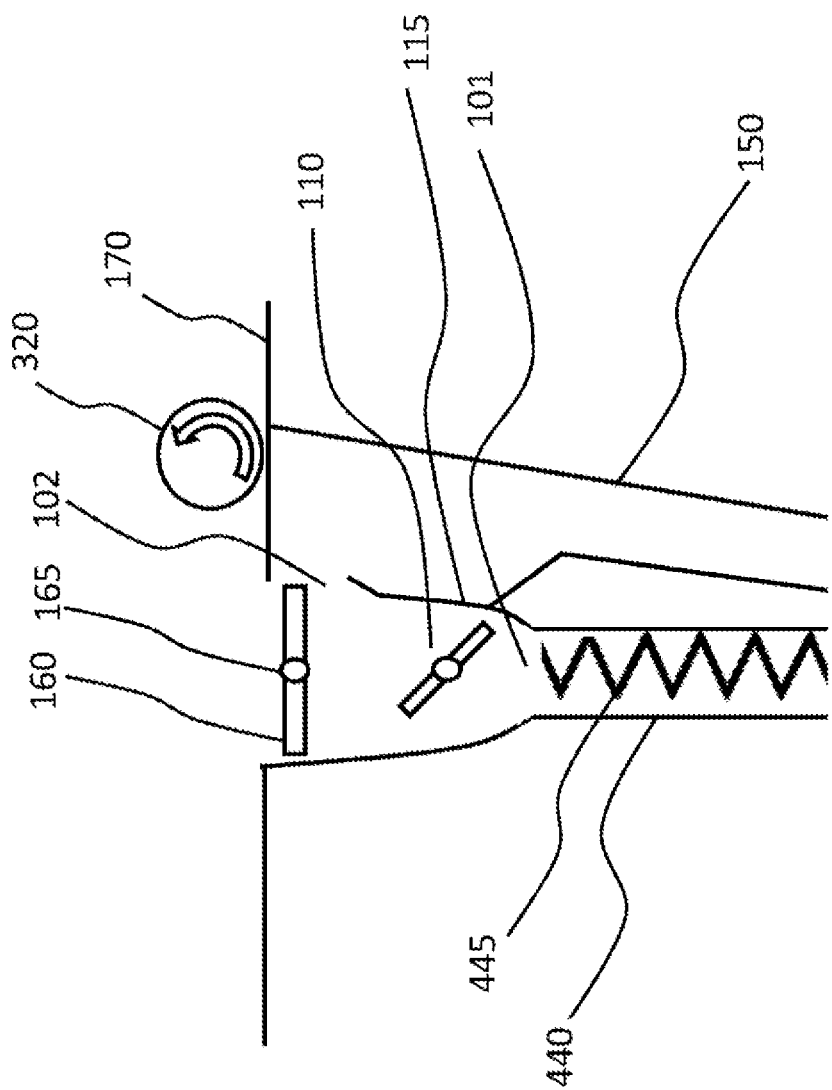
FIG. 5 schematically illustrates another cut through of components of the apparatus.
Figure 6:
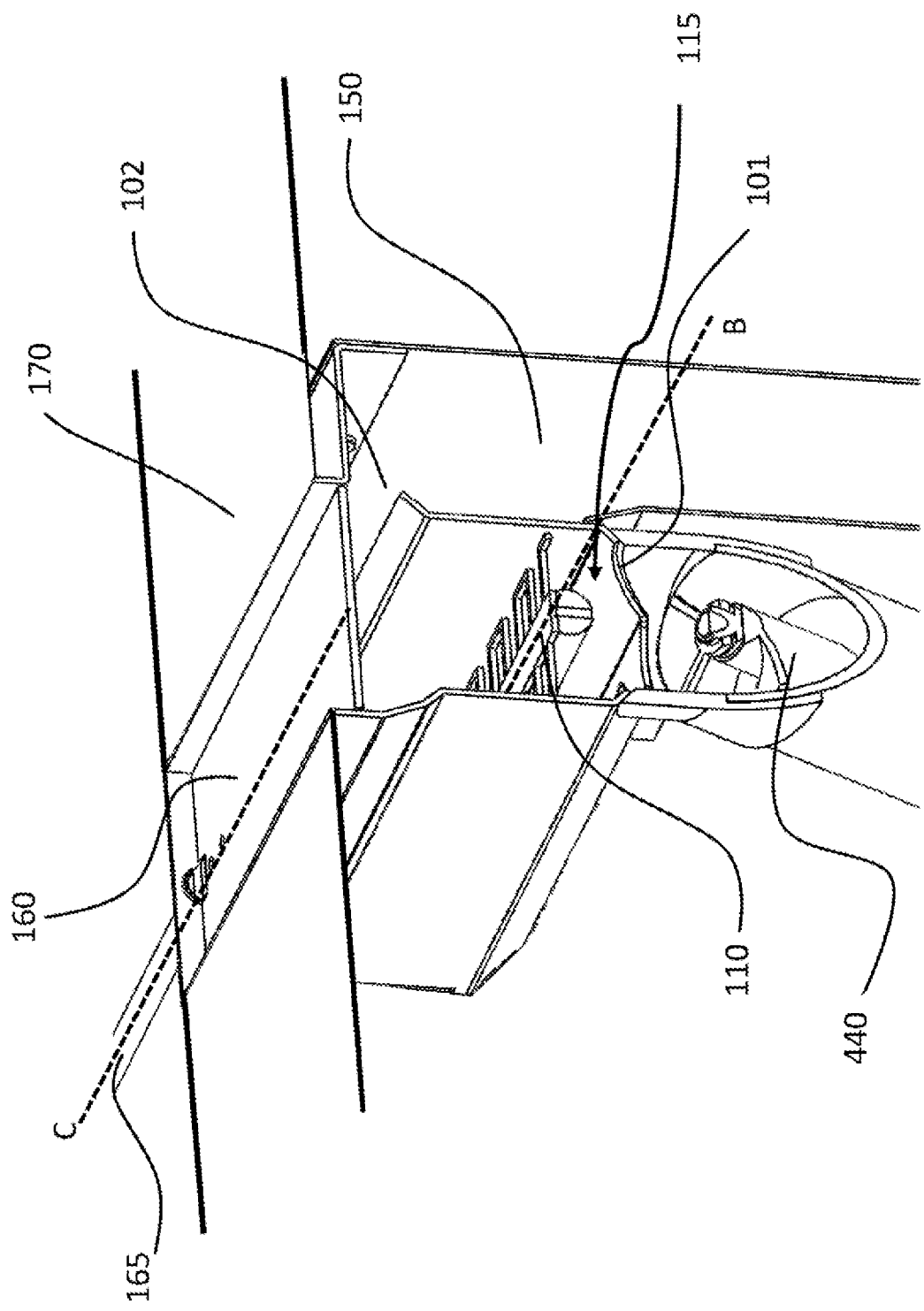
FIG. 6 schematically illustrates another cut through of components of the apparatus.

As illustrated in FIGS. 5 and 6, the delivery tube 440 is connected to a substantially horizontal powder repository 115 at inlet 101, which may for example take the overall shape of an elongate slot. The auger screw 445 conveys the powder along the delivery tube 440 into the repository 115 via inlet 101. The inlet 101 acts as a feed point, feeding the powder into the repository 115. Although FIGS. 5 and 6 illustrates the delivery tube 440 connecting to one end of the repository 115, the delivery tube 440 may be connected at any location along the repository 115, such as at or near one end of the repository 115, or about halfway along the length of the repository 115. According to another embodiment, there may be provided more than one delivery tube 440 and inlet 101, such that the powder is conveyed into the repository 115 from multiple inlets 101.

An agitator 110 is provided within the powder repository 115. Movement of the agitator 110 within the powder repository 115 keeps the powder in a free flowing or near free flowing state, such that it prevents the powder from agglomerating and allows it to spread along the length of the agitator 110 and powder repository 115 by gravitational force. The agitator 110 does not push the powder along the repository 115 by imparting a significant force component on it along the length of the repository 115, and consequently the powder is not compacted. It has been found that when an auger screw is provided in the powder repository 115, the auger screw compacts the powder due to imparting on it a significant force component along the axis of rotation, which also moves the powder along the repository 115 to one end of the repository 115. Compaction inhibits the free flow of the powder which is undesirable. Use of an auger screw 445 in the delivery tube 440 additionally therefore requires use of an agitator 110 in the powder repository, arranged in close proximity or as a combined part, to agitate the powder efficiently and prevent it from agglomerating before it is delivered onto the work surface 170.

FIGS. 8 to 12 illustrate several different embodiments of an agitator 110. Each of the illustrated agitators 110 comprise a shaft 135, defining an axis of rotation B, and at least one projection or blade 120, 122, 124, 126 coupled to the shaft 135. The at least one projection or blade 120, 122, 124, 126 extends outwardly from the shaft 135.

The agitator 110 is capable of rotational movement within the repository 115 about the axis of rotation B. According to one embodiment, the agitator 110 is capable of full rotation within the repository 115. According to another embodiment, the agitator 110 is capable of partial (e.g. clockwise and anticlockwise) rotation within the repository 115. Movement of the agitator 110 within the repository does not result in an overall directional force being applied to the powder within the repository, along the axis of rotation B. Instead, movement of the agitator 110 within the repository result in agitation of the powder to maintain the powder in a free-flowing state within the repository 115. Movement of the powder along the repository 115 happens as a result of gravitational forces.

The agitator 110 is sized such that there are no areas of "dead space" between the agitator 110 and the internal walls of the repository 115, where powder could accumulate and stagnate. The agitator 110 may be capable of full rotation within the repository 115, when the agitator 110 is sized at its maximum width dimension $AW_M$ to be slightly smaller than the internal width dimension $RW_M$ of the repository 115. This allows the agitator 110 to freely rotate within the repository 115 without contacting the internal walls of the repository 115. For example, the maximum width dimension $AW_M$ of the agitator 110 may be 1 mm to 2.5 mm less than the internal width dimension $RW_M$ of the repository 115. This distance may vary dependent on the size of the agitator 110, the size of the repository 115, and the grain size of the powder.

According to another embodiment, the agitator 110 may only be capable of partial rotation within the repository 115. The agitator 110 may be rotated backwards and forwards through part of a rotation, for example, the agitator 110 may be rotated 180° in a forward direction about the axis of rotation B and then rotated 180° in a backwards direction, opposite to the forward direction, about the axis of rotation B. This arrangement may be useful when the at least one projection or blade 120, 122, 124, 126 extends outwardly from only one side of the shaft 135.

Figure 8:
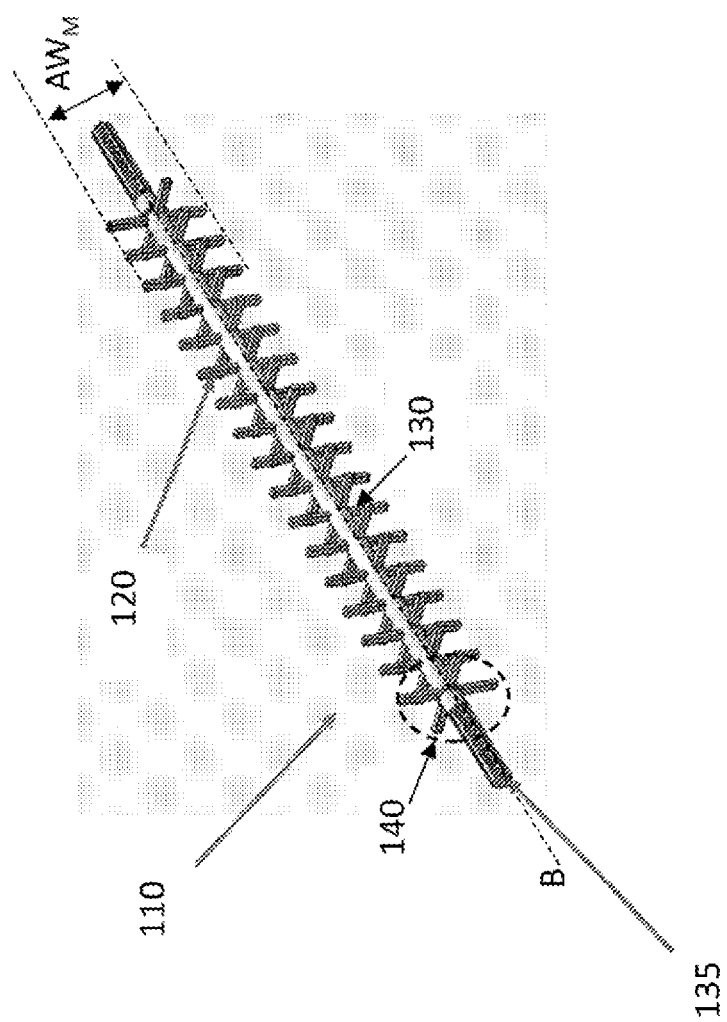
FIG. 8 schematically illustrates an embodiment of an agitator.

FIG. 8 illustrates one embodiment of an agitator 110. The agitator 110 comprises a plurality of projections 120 mounted on a shaft 135. The projections 120 extend radially outwardly from the shaft 135. As illustrated in FIG. 8, the projections 120 are arranged into a plurality of groups 140 spaced apart along the shaft 135, for example at a constant distance as shown. Cavities 130 exist between the projections 120. For example, as illustrated in FIG. 9A, when looking along the axis B, there are cavities 130 formed between adjacent projections 120. In addition, as illustrated in FIG. 9B, when looking along the length of the shaft 135, there are also cavities 130 formed between adjacent groups 140 of projections 120.

Each group 140 comprises four projections 120 provided in the same plane. However, the agitator 110 is not limited to having four projections in each group 140, for example, the agitator 110 may be provided with groups of three, five, six etc. projections. Furthermore, according to the embodiment illustrated in FIG. 8, the projections 120 within each group are equally spaced around the shaft 135. However, the projections 120 are not required to be equally spaced around the shaft 135. Moreover, the groups 140 of projections 120 are not required to be equally spaced apart along the shaft 135. FIG. 8 illustrates seventeen groups of projections, however, the agitator 110 is not limited to having seventeen groups of projections and any number of groups 140 may be provided as required. The number of groups of projections required will depend on the length of the shaft 135 and the properties of the powder, for example.

The projections 120 illustrated in FIG. 8 and FIGS. 9A and 9B are substantially flat, unlike an auger screw which comprises a curved helical continuous projection or projections. In addition, unlike the auger screw, the projections 120 are not arranged to form a pitch, the projections extend from the shaft at substantially right angles, and do not slope away from the shaft. Furthermore, the cavities 130 enable the powder to flow around the agitator 110 when the agitator 110 is fully or partially rotating. Rotation of an auger screw within the repository 115 would result in the powder being actively moved in the direction of the pitch by imparting a force on the powder, moving the power along in the direction of rotation, i.e. to one end of the repository 115. This is not the case for the agitator described with reference to in FIGS. 8 to 12.

Figure 10:
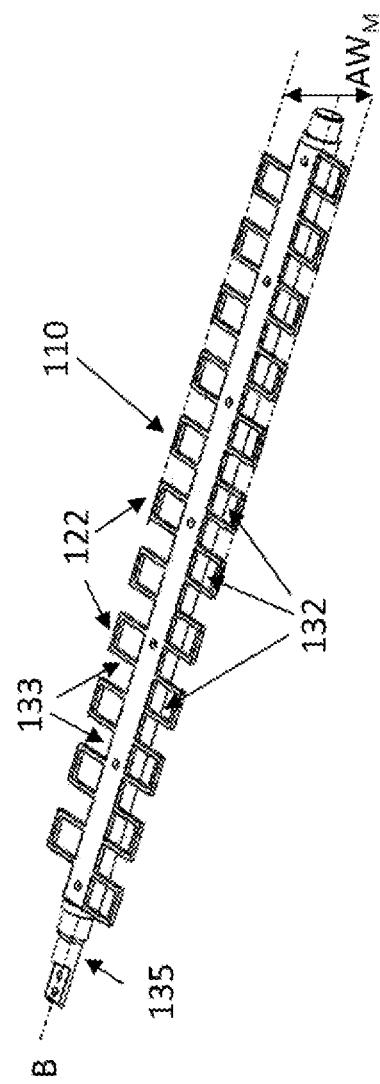
FIG. 10 schematically illustrates an embodiment of an agitator.

FIG. 10 illustrates another embodiment of an agitator 110. The agitator 110 of FIG. 10 comprises a plurality of projections 122 mounted on a shaft 135. The projections 122 extend outwardly from the shaft 135. As illustrated in FIG. 10, each projection 122 is substantially rectangular in shape and has a cavity 132 formed within the projection 122. In addition, cavities 133 are created in the gaps between adjacent projections 122.

The plurality of projections 122 alternately project in opposite directions outwardly from the shaft 135, along the shaft. According to FIG. 10, the plurality of projections 122 are formed as a single piece, which is coupled to the shaft 135. FIG. 10 illustrates twenty-three projections 122, however, any number of projections 122 may be provided as required, depending on the length of the shaft 135.

As with FIG. 8, the projections 122 illustrated in FIG. 10 do not impart a force on the powder in the direction of rotation. In addition, and as before, the agitator 110 illustrated in FIG. 10 comprises cavities 132, 133 which enable the powder to flow around the agitator 110 when the agitator 110 is fully or partially rotating within the repository 115.

Figure 11:
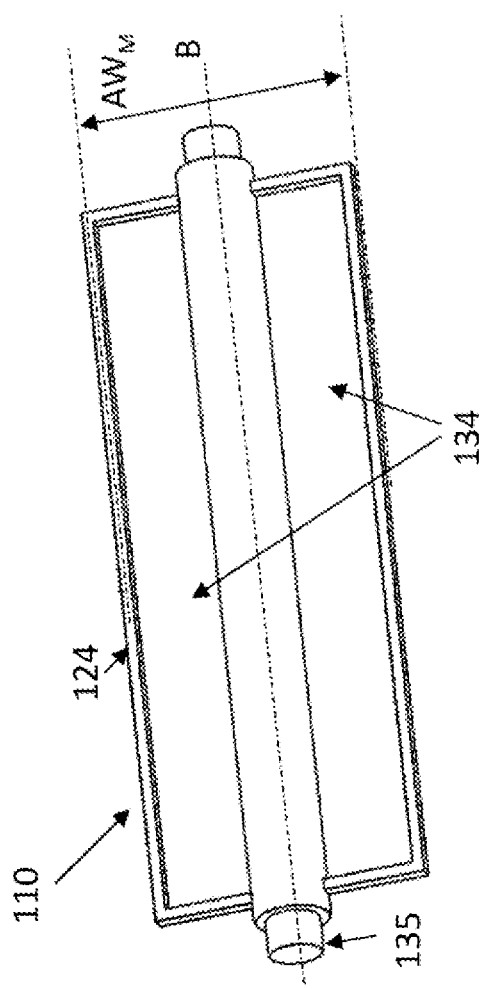
FIG. 11 schematically illustrates an embodiment of an agitator.

FIG. 11 illustrates another embodiment of an agitator 110. The agitator 110 of FIG. 11 comprises two projections 124 mounted on a shaft 135. The projections 124 extend outwardly from the shaft 135. As illustrated in FIG. 11, each projection 124 is substantially rectangular in shape and has a cavity 134 formed within the projection 124. However, in contrast to the embodiment illustrated in FIG. 10, which comprises a plurality of projections 122 provided along the length of the shaft, each of the projections 124 is substantially the same length as the shaft 135.

The two projections 124 project in opposite directions outwardly from the shaft 135. FIG. 11 illustrates two projections 124, however any number of projections 124 may be provided as required. For example, when the agitator 110 is only partially rotated within the repository 115, then only one projections 124, and subsequently one cavity 134 may be provided. The agitator 110 may be rotated backwards and forwards through part of a rotation, for example, the agitator 110 may be rotated 180° in a forward direction about the axis of rotation B and then rotated 180° in a backwards direction, opposite to the forward direction, about the axis of rotation B, such that the one projection 124 rotates forwards and backwards within the repository 115. This arrangement is advantageous since an agitator 110 comprising only one projection may be cheaper to manufacture. The agitator 110 may also be provided with more than two projections 124, for example, the agitator 110 may be provided with three projections 124 or four projections 124, the projections being provided in spaced arrangement around the shaft 135.

As with FIG. 8, the projections 122, 124 illustrated in FIG. 10 and FIG. 11 do not impart a force on the powder in the direction of rotation. In addition, and as before, the agitator 110 illustrated in FIGS. 10 and 11 comprises cavities 132, 133, 134 which enable the powder to move around the agitator 110 when the agitator 110 is fully or partially rotating within the repository 115. In the embodiments shown in FIGS. 10 and 11, the projections 122, 124 are in the shape of frames defining a cavity, however, the projections 122, 124 may be solid, without cavities 132, 134. The force required to be applied to achieve the rotational movement when there are cavities 132, 134 provided within the projections 122, 124 will be lower than when there are no cavities132, 134, which may be desirable.

The projections/blades of the agitators described in FIGS. 8 to 11 may take the form of flat blades that simply slice through the powder. The blades may be solid or open, meaning formed by an outer frame with a cavity within the frame. Such a design would reduce the force needed to rotate the shaft in designs where solid projections or blades would present an appreciable area in the direction of rotation. According to one embodiment, the cavity formed within the projection is at least 50% of the area covered by the projection, and more preferably still at least 90% of the area covered by the projection.

Figure 12:
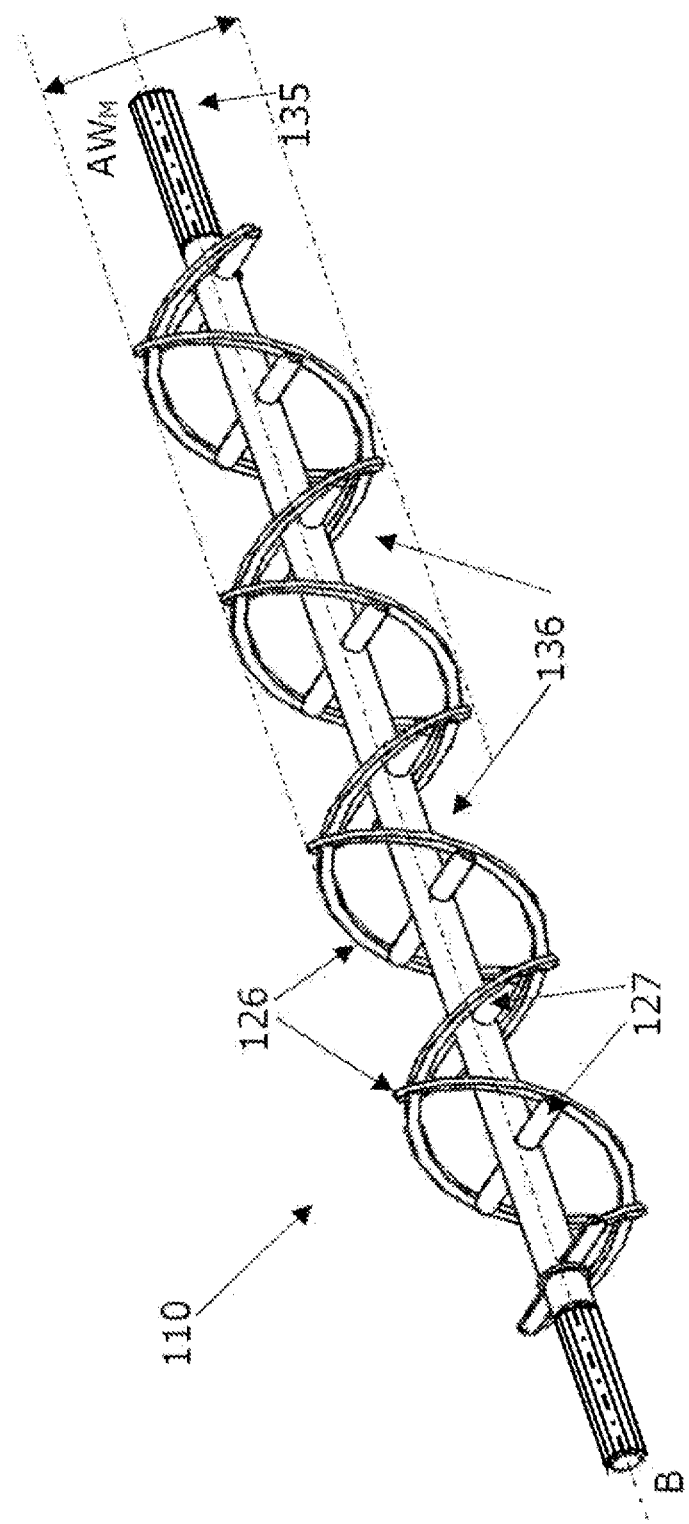
FIG. 12 schematically illustrates an embodiment of an agitator.

FIG. 12 illustrates another embodiment of an agitator 110. The agitator 110 of FIG. 12 comprises two spiral blades 126 mounted on a shaft 135. The blades 126 project outwardly from the shaft 135, and are attached to the shaft 135 with rods 127. As illustrated in FIG. 12, each blade 126 is of a substantially spiral shape. The two blades 126 are arranged about the shaft 135 at opposing pitch, and extend substantially the length of the shaft 135. Cavities 136 are formed in the gaps between the blades 126, the shaft 135 and the rods 127.

FIG. 12 illustrates two spiral blades 126, however, the agitator 110 is not limited to having two blades 126 and any even number of blades 126 may be provided as required. If an odd number of blades 126 were provided, then a small directional force would be applied to the powder within the repository, similar to the auger screw. However, due to the small surface area of the blades 126, unlike for the auger screw, these forces remain small and do not result in powder compaction. Furthermore, because an even number of blades 126 is provided, arranged about the shaft 135 at opposing pitch, the net directional force applied to the powder would be minimal—the two small directional forces, essentially canceling each other out.

The spiral blades 126 are not limited to twisting 360° around the shaft 135. For example, when the agitator 110 is partially rotated within the repository 115, then the spiral blades 126 may twist only 180° around the shaft 135, such that partial rotation of the agitator 110 within the repository 115 rotates the spiral blades 126 backwards and forwards through the powder.

As with FIG. 8, the agitator 110 illustrated in FIG. 12 has cavities 136, which enable the powder to move around the agitator 110 when the agitator 110 is fully or partially rotating within the repository 115 ensuring that the powder flows freely within the repository 115.

It can be seen from FIGS. 8 to 12 the surface area of the blades encountered by the powder along the direction of rotation is less than 50% of the area swept out by the blades along the agitator from an exterior edge of the blades to the axis of rotation (the distance $AW_M$). This open space allows powder to pass through the agitator 110 as it rotates, consequently the agitator 110 is not constantly moving the full weight of powder in the receptacle containing the agitator 110. This means that the motor required to drive the agitator can be of a smaller size and/or power consumption that had the projections taken the form of a solid flat shape. More preferably still, the surface area of the blades encountered by the powder along the direction of rotation is less than 75% of the area swept out by the blades from an exterior edge of the blades to the axis of rotation (the distance $AW_M$), and even more preferably less than 85%.

The projections/blades 120, 122, 124, 126 may be fixedly attached to the shaft 135 or may be formed integrally with the shaft 135. According to one embodiment, the agitator 110, or at least the projections/blades 120, 122, 124, 126 of the agitator 110, is made from a heat resistant, electrically conductive material. An electrically conductive agitator 110 minimises the build-up of static charges generated as a result of the movement of the polymeric powder particles against one another and against the agitator and tube walls. According to one embodiment, the agitator 110 is made from an antistatic polymer to reduce the build-up of charge. According to another embodiment, the agitator 110 is made from steel. The agitator 110 is heat resistant to, at least, the temperature to which the powder is to be heated. The projections/blades 120, 122, 124, 126 of the agitator 110 may be, for example, 1.5 mm wide. However, the optimal width and overall size of the projections/blades varies dependent on the size of the repository 115, the properties of the powder, environmental properties such as humidity and temperature, and process properties such as rotational speed.

As stated above, the projections/blades of the agitator 110 rotate within the repository 115 as a result of rotation of the shaft 135. The projections/blades 120, 122, 124, 126 interact with the powder, which enters the repository 115 from the delivery tube 440, and maintain the free flowing state of the powder from the inlet(s) 101 along the repository 115, preventing the powder from agglomerating and allowing it to flow and spread freely along the repository 115. According to one embodiment, an end portion of the shaft 135 may be connected to a motor (not illustrated) to rotate the shaft 135, and thus the projections/blades 120, 122, 124, 126 within the repository 115. As an example, the shaft 135 may be rotated at a rate of 200 rpm (revolutions per minute).

As illustrated in FIGS. 4 to 6, the repository 115 comprises an oversupply outlet 102 such that when the powder reaches a certain level within the repository 115, the powder flows through the outlet 102 and travels along a recirculating (oversupply) tube 150. The recirculating tube 150 may be arranged such that the powder enters and travels along it by gravitational force.

Figure 7:
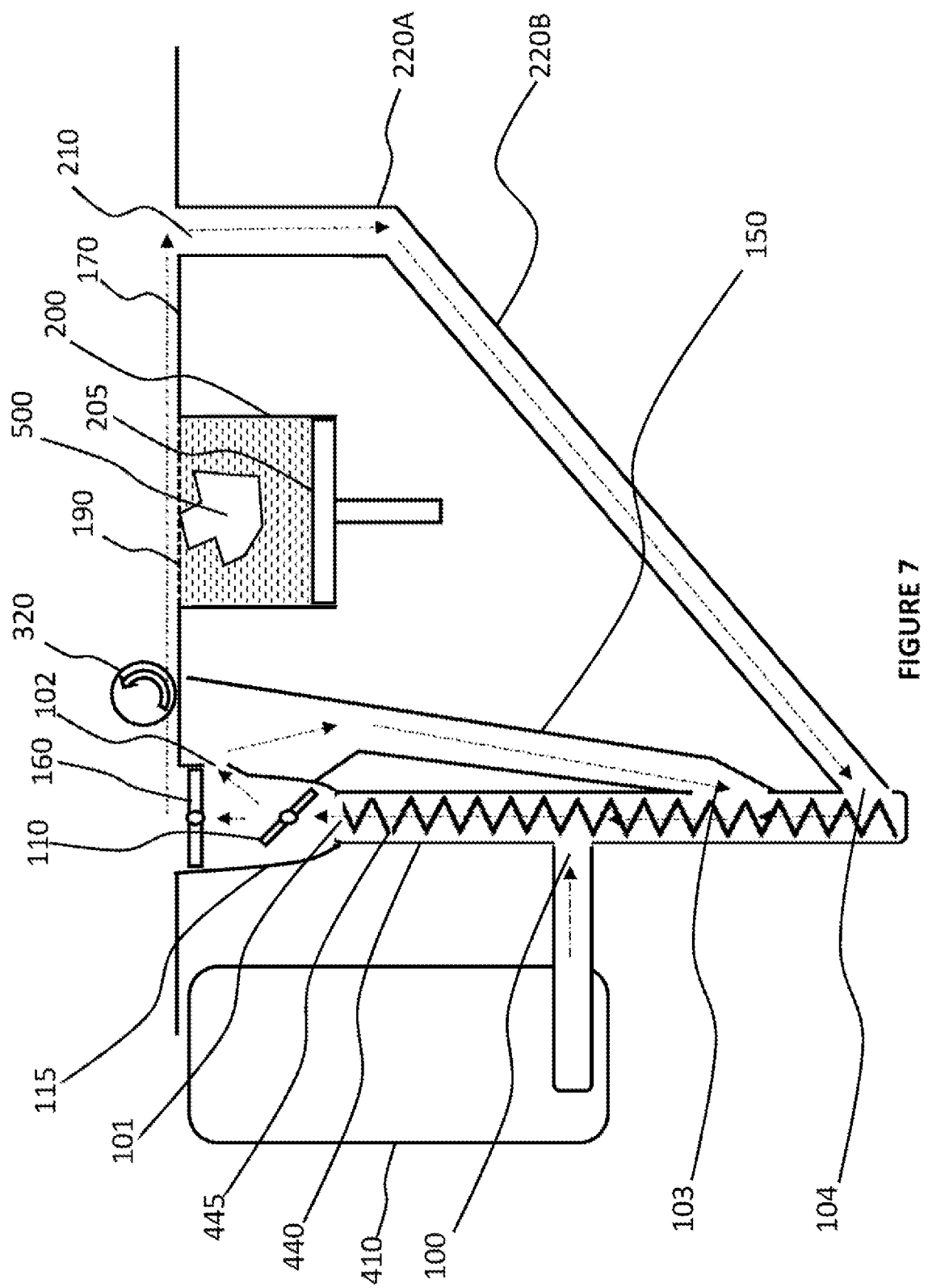
FIG. 7 schematically illustrates another cut through of components of the apparatus.

According to the embodiment illustrated in FIG. 7, the recirculating tube 150 may be connected to the delivery tube 440 at a point upstream of the supply tube 430, such that the returned, unused but heated, powder enters the delivery tube 440 at inlet 103 and is conveyed along the delivery tube 440 by the auger screw 45. The oversupply powder enters the delivery tube 440 when the powder in the delivery tube 440 becomes depleted and, once entered, the oversupply powder is mixed with the virgin powder entering the delivery tube 440 at inlet 100 from the supply tube 430 and travels back to the repository 115 once again. Accordingly, unused oversupply powder is recirculated into the delivery tube 440 to be re-used.

According to one embodiment, as illustrated in FIG. 4, the recirculating tube 150 may comprise an agitator, for example as described above with reference to FIGS. 8 to 12, arranged over part or all of the length of the recirculating tube 150 to ensure free flow of the powder along the oversupply tube 150 aided by gravity.

The recirculating tube 150 may be thermally insulated. Alternatively, where the delivery tube 440 is heated, the recirculating tube 150 may also be heated, preferably to the same temperature where the powder material can tolerate elevated temperatures without degrading.

Returning now to FIGS. 4 to 6, the delivery of powder onto the work surface 170 will be described. The apparatus comprises a dosing blade 160 provided at or near the top of the repository 115. The dosing blade 160 is capable of rotation about the axis of rotation C, which is the axis extending along the length direction of the repository 115 and through the centrally protruding pivot shaft 165. The dosing blade 160 is provided above the agitator 110.

When the dosing blade 160 is rotated through 180 degrees, it pushes powder which has accumulated near the top of the repository 115 onto the work surface 170 to form a pile of powder on the work surface 170, along the length of the top surface of the repository 115.

As illustrated in FIG. 4, the powder is then spread across the work surface 170 by a roller 320, which is arranged on a powder distribution sled 300 discussed in further detail below. The roller 320 pushes the powder across the work surface 170, covering the build area 190 in a thin layer of powder. The thickness of the layer of powder is determined by the distance the floor 205 of the build chamber 200 has been lowered relative to the top surface of the previous layer of powder.

The three-dimensional object 500 to be manufactured is formed within the build area 190 of the build chamber 200. A thin layer of powder is spread across the floor 205 of the build chamber 200. The powder is printed onto and sintered, as discussed in detail below, after which the floor 205 of the build chamber 200 is lowered within the build chamber 200, and the next layer of powder is spread onto the printed powder bed. The layers of powder are built up by successive spreading/printing/sintering steps as each time the floor 205 of the build chamber 200 is lowered within the build chamber 200 by the thickness of a layer of each step.

Any excess powder at the end of travel of roller 320 which has not been used in covering the build area 190 may be recovered for further use. FIG. 4 illustrates a return slot 210 provided to the work surface 170 at a side opposite from the dosing blade 160. The return slot 210 may be arranged to receive any excess powder, which is pushed into the return slot 210 by the roller 320.

The return slot 210 is coupled to a return tube 220. The return tube 220 may comprise two tubes, namely, an upper return tube 220A and a lower return tube 220B. The return slot 210 may contain an agitator as described above with reference to FIGS. 8 to 12, so as to maintain the powder in a free flowing state.

The excess powder travels along the return tube 220. The return tube 220 may be arranged such that the excess powder travels along it by gravitational force.

The return tube 220 (the lower return tube 220B) may be connected to the delivery tube 440, as illustrated in FIG. 7, at a point upstream of the supply tube 430, such that the excess powder enters the delivery tube 440 at inlet 104 when the powder in the delivery tube becomes depleted. Once entered, it is conveyed along the delivery tube 440 by the auger screw 445. The excess powder mixes with the virgin powder entering the delivery tube 440 at inlet 100 from the supply tube 430 and travels back to the repository 115 once again. Accordingly, unused excess powder is recirculated via the return tube 220 into the delivery tube 440 to be re-used. The excess powder travels along the return tube by gravitational forces.

The return tube 220 may be thermally insulated. Where the delivery tube 440 is heated, the return tube 220 may also be heated, preferably to the same temperature, for powder materials able to tolerate prolonged elevated temperatures without degrading significantly.

As illustrated in FIG. 4, the return tube 220 may be connected to the recirculating tube 150, such that the excess powder and the overflow powder combined enters the delivery tube 440 at the same inlet. It may be beneficial to connect the return tube 220 and the recirculating tube 150 so as to minimise the entry points into the delivery tube 440. Additionally, by combining the excess powder and overflow powder prior to entry to the delivery tube 440, the excess powder and the overflow powder are given the same priority of being reintroduced into the delivery tube 440.

Alternatively, the return tube 220 may be connected to the delivery tube 440 at an inlet 104 upstream of the inlet 100 from the supply tube 430, and for example also upstream of the inlet 103 of the oversupply tube. This prioritises the use of powder from the oversupply tube over that of the return tube. This arrangement is illustrated in FIG. 7.

It will be appreciated that references to the supply tube 430, recirculating tube 150 and return tube 220 do not limit such tubes to having a cylindrical cross section. Instead, the tubes may have any suitable cross section, for example that of a semicircle, oblong, or rectangular cross section etc. Furthermore, the powder repository 115, supply tube 430, recirculating tube 150 and return tube 220 may all be considered flow paths for the powder. Moreover, the powder repository 115, the supply tube 430, the recirculating tube 150 and/or the return tube 220 may comprise an agitator so as to maintain the powder in a free flowing state whilst traveling along these powder flow paths.

Turning now to the operation of the powder distribution sled 300 and the printing sled 350, FIG. 1 illustrates two independently operable sleds 300, 350 provided above the work surface of the apparatus. The powder distribution sled 300 comprises a roller 320, and the printing sled 350 comprises a sinter source 360, such as a sinter lamp, and printheads 370. The powder distribution sled 300 may also comprise a pre-heat source 310.

The pre-heat source 310 and the sinter source 360 are infrared radiation sources that may comprise halogen lamps, either in the form of modular sources or a full width single bulb; arrays of infrared radiation (IR) light-emitting diodes (LEDs); ceramic lamps; or any other suitable infrared radiation emitter.

The one or more printheads for depositing the RAM may be a standard drop on demand printhead suitable for use in an HSS apparatus, such as a Xaar 1003 printhead. The Xaar 1003 printhead for example is able to deposit RAM suspended or soluble in a variety of liquids, and tolerates well the challenging hot and particulate environment of an HSS printer due to its highly effective ink recirculation technology.

Returning to FIG. 1, the sleds 300, 350 may be moved across the work surface 170 of the apparatus 1 via motors provided on each sled which utilise the same drive belt, although other methods of moving the sleds may be utilised, as known in the art. According to one embodiment, the two sleds 300, 350 are movable on the same set of rails. According to another embodiment, the two sleds 300, 350 are movable on separate rails.

Following rotation of the dosing blade 160 to deposit a pile of powder on the work surface 170, the powder distribution sled 300 travels across the dosing blade 160 and pushes the powder across the work surface 170 of the apparatus. The pile of powder is spread across the work surface 170 by the roller 320, such that a layer of powder covers the build area 190 and any excess powder is pushed down the return slot 210. When the powder distribution sled 300 also comprises a pre-heat source 310, the layer of powder is heated by the preheat lamp 310 as it is spread across the build area 190 by the roller 320. However, when the powder distribution sled 300 does not comprises a pre-heat source 310, an overhead heat source may be provided above the build area 190.

The printing sled 350 is then moved across the work surface 170 of the apparatus, and an absorber, such as a radiation absorbent material (RAM), is printed onto the layer of powder within the build area 190 in accordance with image data defining the pattern of each layer of the final object being built, by the printheads 370. The printed portion of the layer of powder in the build area 190 is then sintered as the sinter lamp 360 is moved across the entire build area 190, with the effect that only the powder that received the absorber heats up sufficiently to fuse.

The floor 205 of the build chamber 200 is lowered within the build chamber 200, and the next layer of powder is spread across the work surface 170 by the roller 320, and the process begins again. The build chamber floor 205 is lowered by the thickness of a layer of the build, this might be in the region of 0.1 mm.

In order to provide ease of access to the build area 190, the rails may be offset from one another vertically. For example, the rail at the front of the machine may be below the level of the work table to allow easy access to the chamber whilst the back rail may be above the height of the work table to allow access for maintaining or cleaning the rail.

The position of the sleds 300, 350 relative to the build area 190 may be monitored by a position sensor provided on each sled 300, 350. The position sensors may be magnetic sensors with scale mounted on a static part of the machine, a rotary encoder, an optical sensor with scale mounted on a static part of the machine, laser positioning, etc.

As is known in the art, high speed sintering machines operate at high temperatures, in particular in the proximity of the build area. For example, the temperature near the build area may be around 130° C. Consequently, temperature sensitive elements of the machine, such as printheads 370, may require to be shielded from the heat. For example, an insulated housing may be provided around the printheads to provide such shielding.

An overhead heater 460 may be provided above the build area to provide a uniform temperature above the build area. The overhead heater 460 may be any fixed infrared radiation source, such as ceramic IR lamps or any other suitable radiation source.

According to one embodiment, bearings may be provided on one side of each sled 300, 350, the bearings being movable orthogonal to the direction of movement of the sleds 300, 350 to allow the sleds 300, 350 to expand or contract with changes in temperature.

It is known that to achieve an even build area temperature it is beneficial to deposit several buffer layers of powder on the build chamber floor 205 to help mitigate the effects of unevenness in temperature distribution across the surface of the build area 190. This may be done in addition to the base of the build chamber floor 205 being heated.

A printhead cleaning station may be provided. The printhead cleaning station may be located at the opposite end of the work table to the dosing blade 160. Once the printing sled 350 has reached the end of the stroke, the printheads 370 may be cleaned before the next stroke. The printheads 370 may be cleaned after every stroke, every set number of strokes or in response to a printhead nozzle monitoring system.

Although a high speed sintering apparatus and process has been described in order to illustrate how the described invention may be incorporated in apparatus for the formation of three dimensional objects, it will be understood that the agitators and stirrers may equally be used in conjunction with a different apparatus and processes of manufacturing for three dimensional objects that requires the delivery of powder to a work surface. This may for example include laser sintering, print and binder or electron beam apparatus and processes using a variety of powder materials.

Detailed embodiments have been described above, together with some possible modifications and alternatives. It will be clear to one skilled in the art that many improvements and further modifications and alternatives can be made to the foregoing exemplary embodiments without departing from the scope of the present techniques. Some particular modifications will now be described, as follows:

Tank sensor(s)—The holding tank 410 may further comprise one or more sensors to detect or measure the level of powder in the holding tank 410. This is advantageous so as to avoid malfunctioning of the stirring device 420 and also to avoid the compaction of the powder in the holding tank 410. Moreover, by detecting the powder level in the holding tank 410, it is possible to make sure that there is enough powder in the holding tank 410 for manufacturing the three-dimensional object. The or each sensor may be a binary, digital or analog sensor. The type of sensor is not limited. Any kind of sensor generally known in the art to detect powder levels may be used, such as an optical sensor, capacitive sensor, thermal response sensor, rotary sensor etc.

The apparatus may further comprise a controller. The measured level of powder may be fed to the controller. In response to the measured level of powder exceeding a threshold level, the controller may stop the stirring device 420, or may alert the user by sending signals or by displaying a warning on a display panel.

Figure 13:
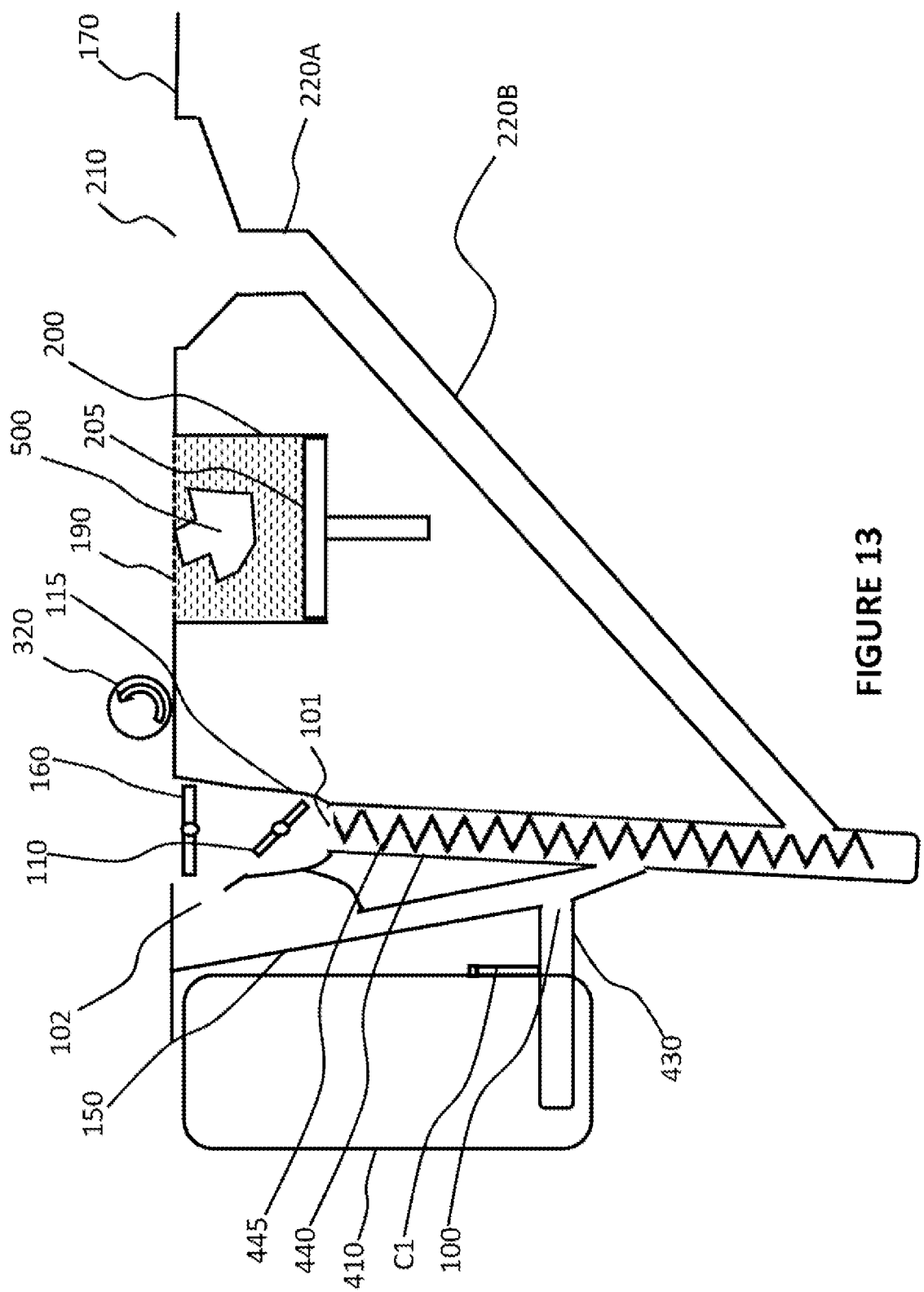
FIGS. 13 and 14 schematically illustrate possible locations of powder outlet apertures.
Figure 14:
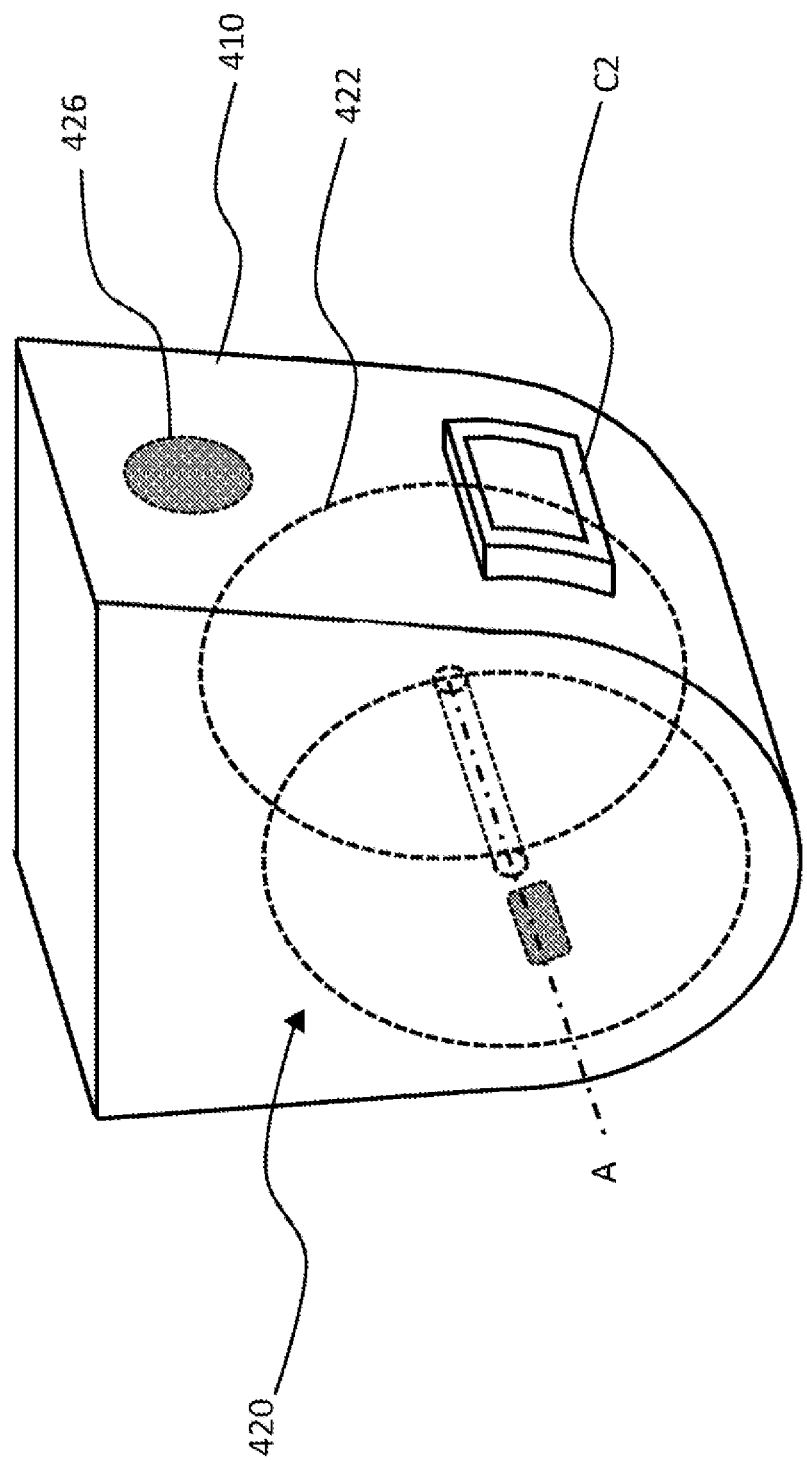

Tank closing system—As illustrated in FIGS. 13 and 14, the holding tank 410 may further comprise an outlet aperture (e.g. a slot or other opening) for emptying the contents of the holding tank 410, and a means C1, C2 to uncover the aperture (such as a valve or an actuator-operated switch, or a sliding mechanism such as a blade, or a moving mechanism) to thereby allow the powder to flow though. The means may be arranged at the lowest point on the holding tank 410 so that the powder can flow by gravitational force.

Furthermore, the holding tank 410 may comprise a separate aperture (not shown) for servicing—for example, to empty the holding tank 410 and to access the internal components of the powder recirculation system without removing the holding tank or any major components of the powder recirculation system. This aperture may be accessed by screws and a closing plate.

Closing summary—An agitator for agitating powder within a powder flow path of an apparatus for manufacturing three-dimensional objects is described herein. According to one embodiment the at least partial rotation of the agitator comprises a full rotation of the agitator about the axis of rotation.

According to another embodiment, the surface area of the projections encountered by the powder along the direction of rotation is less than 50% of an area swept out by the projections along the agitator from an exterior edge of the projections to the axis of rotation (distance $AW_M$).

According to another embodiment, the surface area of the projections encountered by the powder along the direction of rotation is less than 75% of an area swept out by the projections along the agitator from an exterior edge of the projections to the axis of rotation (distance $AW_M$).

According to another embodiment, the surface area of the projections encountered by the powder along the direction of rotation is less than 85% of an area swept out by the projections along the agitator from an exterior edge of the projections to the axis of rotation (distance $AW_M$).

According to another embodiment, the at least one projection extends outwardly from the axis of rotation within a plane perpendicular to the axis of rotation.

According to another embodiment, the at least one projection comprises a cavity formed within the projection.

According to another embodiment, the cavity formed within the projection is at 50% of the area covered by the projection, and more preferably at least 90% of the area covered by the projection.

According to another embodiment, the at least one projection extends the length of the agitator in contact with the powder.

According to another embodiment, the at least one projection comprises a plurality of projections provided in spaced arrangement.

According to another embodiment, the at least one projection comprises two or more projections extending outwardly in opposite directions.

According to another embodiment, the at least one projection comprises two or more projections and the agitator further comprises at least one cavity formed between the two or more projections.

According to another embodiment, the at least one projection comprises an even number of spiral blades extending along the length of the agitator where the agitator is in contact with the powder, wherein the even number of spiral blades have opposing pitches.

According to another embodiment, a cavity is formed within the even number of spiral blades.

According to another embodiment, the at least one projection comprises a heat resistant, electrically conductive material.

According to another embodiment, the at least one projection comprises an antistatic polymer.

A stirring device for a powder tank of an apparatus for manufacturing a three-dimensional object is described herein. According to one embodiment, the stirring device further comprises: at least one blade extending from the at least one strut into the build powder tank, and forming an acute angle with the at least one strut.

According to another embodiment, at least one strut comprises a leading edge extending parallel to the axis of rotation, and a trailing edge forming the obtuse angle facing the direction of rotation.

According to another embodiment, the at least one strut extends from a peripheral edge of the at least one base plate.

According to another embodiment, the at least one base plate comprises two base pates.

According to another embodiment, the stirring device mixes at least two powders together to form a mixture with an even distribution of the at least two powders.

According to another embodiment, the at least two powders comprise virgin powder and powder previously used, but not sintered, in the apparatus for manufacturing a three-dimensional object.

The invention claimed is:

1. An apparatus for manufacturing a three-dimensional object, the apparatus comprising:
    a powder tank;
    a stirring device configured to rotate within the powder tank about an axis of rotation, wherein the stirring device includes,
    a base plate, and
    a strut extending from the base plate into the powder tank, the strut including a leading portion having a leading edge with respect to the direction of rotation, and a trailing portion having a trailing edge with respect to the direction of rotation, the leading portion having an inner face facing the axis of rotation and into the powder tank, and the trailing portion having an inner face facing the axis of rotation and into the powder tank and forming an obtuse angle with the inner face of the leading portion, one or more blades extending from the inner face of the trailing portion into the powder tank and towards the inner face of the leading portion, each of the one or more blades forming an acute angle with the leading edge of the strut; and
    the powder tank further including an inner wall extending parallel to the axis of rotation and having an inner wall surface conforming at least partially to a portion of the shape of the base plate, wherein the strut is mounted to the outer periphery of the base plate such that upon rotation of the stirring device about the axis of rotation the leading edge of the strut sweeps the inner wall surface of the tank and lifts the powder within the tank.

2. The apparatus of claim 1, wherein the strut extends from a peripheral edge of the base plate.

3. The apparatus of claim 1, wherein
    the base plate is a first base plate;
    the apparatus further comprises a second base plate and a further one or more struts;
    the second base plate is arranged facing the first base plate; and
    the struts extend between and connect the first and second base plates.

4. The apparatus of claim 3, wherein the base plates are of a circular shape.

5. The apparatus of claim 3, wherein the base plates are of a shape that conforms to the internal shape of the powder tank.

* * * * *